(12) United States Patent
Kwon

(10) Patent No.: US 9,133,911 B2
(45) Date of Patent: Sep. 15, 2015

(54) DOUBLE CLUTCH TRANSMISSION OF VEHICLE

(71) Applicant: Hyundai Motor Company, Seoul (KR)

(72) Inventor: Yeo Hyoun Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/328,313

(22) Filed: Jul. 10, 2014

(65) Prior Publication Data

US 2015/0119183 A1 Apr. 30, 2015

(30) Foreign Application Priority Data

Oct. 28, 2013 (KR) .................. 10-2013-0128677

(51) Int. Cl.
*F16H 3/44* (2006.01)
*F16H 3/093* (2006.01)
*F16H 37/04* (2006.01)

(52) U.S. Cl.
CPC .................. *F16H 3/093* (2013.01); *F16H 3/44* (2013.01); *F16H 37/046* (2013.01)

(58) Field of Classification Search
CPC ........... F16H 3/093; F16H 3/44; F16H 37/04; F16H 37/046; F16H 37/06; F16H 2003/008; F16H 2003/447; F16H 2037/048; F16H 2037/049

USPC ............ 475/207, 201, 204, 206, 218; 74/330, 74/331

See application file for complete search history.

(56) References Cited

U.S. PATENT DOCUMENTS

| 9,003,905 | B1* | 4/2015 | Lee et al. .......................... 74/330 |
| 2005/0081661 | A1* | 4/2005 | Kim ................................. 74/333 |
| 2007/0199393 | A1* | 8/2007 | Hattori ............................. 74/331 |
| 2007/0214906 | A1* | 9/2007 | Fahland et al. .................. 74/340 |
| 2011/0214533 | A1* | 9/2011 | Koyama et al. ............. 74/665 A |

FOREIGN PATENT DOCUMENTS

| EP | 2428699 A1 * | 9/2010 |
| FR | 2880092 A1 * | 12/2004 |
| WO | WO2007098842 A1 * | 9/2007 |

* cited by examiner

*Primary Examiner* — Roger Pang
(74) *Attorney, Agent, or Firm* — Morgan, Lewis & Bockius LLP

(57) ABSTRACT

A double clutch transmission of a vehicle is disclosed. The double clutch transmission may selectively transmit power of a power source to two input shafts through two clutches and may output changed power through two output shafts after the power selectively transmitted to the two input shafts is changed. The two input shafts may respectively have a plurality of input gears fixed thereon, the two output shafts may respectively have a plurality of speed gears rotatable on the output shafts and a plurality of synchronizers operably connecting each speed gear to any one of the output shafts, and each input gear may be engaged with at least one speed gear.

20 Claims, 4 Drawing Sheets

DOUBLE CLUTCH TRANSMISSION OF VEHICLE

CROSS-REFERENCE TO RELATED APPLICATION

The present application claims priority of Korean Patent Application Number 10-2013-0128677 filed on Oct. 28, 2013, the entire contents of which application are incorporated herein for all purposes by this reference.

BACKGROUND OF INVENTION

1. Field of Invention

The present invention relates to a double clutch transmission of a vehicle that can achieve seven forward speeds without increasing a length of the transmission.

2. Description of Related Art

A double clutch transmission of a vehicle includes two clutch devices, two input shafts and two output shafts. The double clutch transmission (DCT) selectively transmits torque of an engine to two input shafts through two clutch devices, converts the torque into target torque using a plurality of input gears disposed on the two input shafts and a plurality of speed gears engaged respectively to the input gears and disposed on the two output shafts and outputs the target torque.

Such the DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCTs have different layouts according to vehicle manufacturers. The DCT realizing six forward speeds or seven forward speeds is being developed to enhance fuel consumption and efficiently use engine driving torque.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a double clutch transmission of a vehicle having advantages of being mounted in a vehicle without layout change of an engine compartment and curtailing cost by minimizing a length of the transmission and achieve seven forward speeds.

A double clutch transmission of a vehicle according to various aspects of the present invention may include: a variable connecting device including first and second clutches and selectively transmitting power of a power source; an input device including a first input shaft selectively receiving the power of the power source through the first clutch, and a second input shaft disposed at a radial exterior of the first input shaft without rotational interference therebetween and selectively receiving the power of the power source through the second clutch; a speed output device including a first speed output unit disposed in parallel with the first and second input shafts, changing the power transmitted from the first input shaft or the second input shaft into four forward speeds and outputting the four forward speeds, and a second speed output unit disposed in parallel with the first and second input shafts, changing the power transmitted from the first input shaft or the second input shaft into two forward speeds and outputting the two forward speeds; a first transfer gear assembly disposed in the second speed output unit, reducing rotational speed of the power transmitted from the second input shaft and outputting the reduced rotational speed; and a second transfer gear assembly disposed in parallel with the second speed output unit, changing the rotational speed transmitted from the first transfer gear assembly selectively into one forward speed or one reverse speed and transmitting the one forward speed or the one reverse speed to the second speed output unit.

The first input shaft may be provided with first, second and third input gears sequentially disposed thereon, wherein the first input gear is an input gear for achieving a fourth forward speed, the second input gear is an input gear for achieving a second forward speed and the third input gear is an input gear for achieving a sixth forward speed.

The second input shaft may be provided with fourth and fifth input gears sequentially disposed thereon, wherein the fourth input gear is an input gear for achieving a first forward speed, a third forward speed and the reverse speed, and the fifth input gear is an input gear for achieving a fourth forward speed.

The first speed output unit may include: a first output shaft disposed in parallel with and away from the first and second input shafts; third, fourth, sixth and seventh speed gears disposed on the first output shaft; a first synchronizer selectively connecting the third forward speed gear or the seventh forward speed gear to the first output shaft; a second synchronizer selectively connecting the fourth forward speed gear or the sixth forward speed gear to the first output shaft; and a first output gear fixedly disposed on the first output shaft.

The third forward speed gear may be engaged with the fourth input gear and the seventh forward speed gear may be engaged with the fifth input gear.

The fourth forward speed gear may be engaged with the first input gear and the sixth forward speed gear may be engaged with the third input gear.

The second speed output unit may include: a second output shaft disposed in parallel with and away from the first and second input shafts; second and fifth speed gears disposed on the second output shaft; a third synchronizer selectively connecting the second forward speed gear or the fifth forward speed gear to the second output shaft; and a second output gear fixedly disposed on the second output shaft.

The second forward speed gear may be engaged with the second input gear and the fifth forward speed gear may be engaged with the fifth input gear.

The first transfer gear assembly may include: a first transfer gear shaft disposed at a radial exterior of the second output shaft of the second speed output unit without rotational interference therebetween; a first transfer input gear formed on an end portion of the first transfer gear shaft and engaged with the fourth input gear of the second input shaft; and a first transfer output gear formed on the other end portion of the first transfer gear shaft.

The second transfer gear assembly may include: a second transfer gear shaft disposed in parallel with and away from the first and second input shafts; a rotating direction changing device disposed on the second transfer gear shaft and adapted to receive the power from the second input shaft through a second transfer input gear and to change a rotating direction of the power; a fourth synchronizer controlling the rotating direction changing device to change the rotating direction; and a second transfer output gear transmitting power from the second transfer gear shaft to the second speed output device.

The double clutch transmission may further include a parking brake gear fixedly disposed at the second transfer gear shaft.

The rotating direction changing device may include: an idle shaft disposed at a radial exterior of the second transfer gear shaft without rotational interference therebetween; a second transfer input gear fixedly disposed on a side portion of the idle shaft and receiving the power from the first transfer gear assembly; a first sun gear fixedly disposed on the other side portion of the idle shaft; a second sun gear fixedly disposed on the second transfer gear shaft; and a carrier disposed at a radial exterior of the second transfer gear shaft without rotational interference therebetween and rotatably supporting a first pinion engaged with the first sun gear and a second pinion engaged with the first pinion and the second sun gear.

The fourth synchronizer may include: a hub gear fixedly connected to the carrier; a sleeve engaged with an external circumference of the hub gear and being movable in an axial direction; a first forward speed clutch gear fixedly disposed on the second transfer gear shaft at a side of the hub gear and selectively engaged with the sleeve; and a fixed clutch gear fixedly connected to a transmission housing at the other side of the hub gear and selectively engaged with the sleeve.

A double clutch transmission of a vehicle according to various other aspects of the present invention may include: a variable connecting device including first and second clutches and selectively transmitting power of a power source; an input device including a first input shaft provided with first, second and third input gears fixedly disposed on an external circumference thereof and selectively receiving the power of the power source through the first clutch, and a second input shaft provided with fourth and fifth input gears fixedly disposed on an external circumference thereof, disposed at a radial exterior of the first input shaft without rotational interference therebetween and selectively receiving the power of the power source through the second clutch; a first speed output unit including a first output shaft disposed in parallel with the first and second input shafts and provided with a first output gear fixedly disposed on an external circumference thereof, third, fourth, sixth and seventh speed gears disposed on the first output shaft, a first synchronizer selectively connecting the third forward speed gear or the seventh forward speed gear to the first output shaft and a second synchronizer selectively connecting the fourth forward speed gear or the sixth forward speed gear to the first output shaft; a second speed output unit including a second output shaft disposed in parallel with the first and second input shafts and provided with a second output gear fixedly disposed on an external circumference thereof, second and fifth speed gears disposed on the second output shaft and a third synchronizer selectively connecting the second forward speed gear or the fifth forward speed gear to the second output shaft; a first transfer gear assembly disposed in the second speed output unit, changing a rotational speed of the power transmitted from the second input shaft and outputting the changed rotational speed; and a second transfer gear assembly disposed in parallel with the second speed output unit, changing the rotational speed transmitted from the first transfer gear assembly selectively into one forward speed or one reverse speed and transmitting the one forward speed or the one reverse speed to the second speed output unit.

The third forward speed gear may be engaged with the fourth input gear and the seventh forward speed gear may be engaged with the fifth input gear.

The fourth forward speed gear may be engaged with the first input gear and the sixth forward speed gear may be engaged with the third input gear.

The second forward speed gear may be engaged with the second input gear and the fifth forward speed gear may be engaged with the fifth input gear.

The first transfer gear assembly may include: a first transfer gear shaft disposed at a radial exterior of the second output shaft of the second speed output unit without rotational interference therebetween; a first transfer input gear formed on an end portion of the first transfer gear shaft and engaged with the fourth input gear of the second input shaft; and a first transfer output gear formed on the other end portion of the first transfer gear shaft.

The second transfer gear assembly may include: a second transfer gear shaft disposed in parallel with and away from the first and second input shafts; a rotating direction changing device disposed on the second transfer gear shaft and adapted to receive the power from the second input shaft through a second transfer input gear and to change a rotating direction of the power; a fourth synchronizer controlling the rotating direction changing device to change the rotating direction; and a second transfer output gear transmitting power from the second transfer gear shaft to the second speed output device.

The rotating direction changing device may include: an idle shaft disposed at a radial exterior of the second transfer gear shaft without rotational interference therebetween; a second transfer input gear fixedly disposed on a side portion of the idle shaft and receiving the power from the first transfer gear assembly; a first sun gear fixedly disposed on the other side portion of the idle shaft; a second sun gear fixedly disposed on the second transfer gear shaft; and a carrier disposed at a radial exterior of the second transfer gear shaft without rotational interference therebetween and rotatably supporting a first pinion engaged with the first sun gear and a second pinion engaged with the first pinion and the second sun gear.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
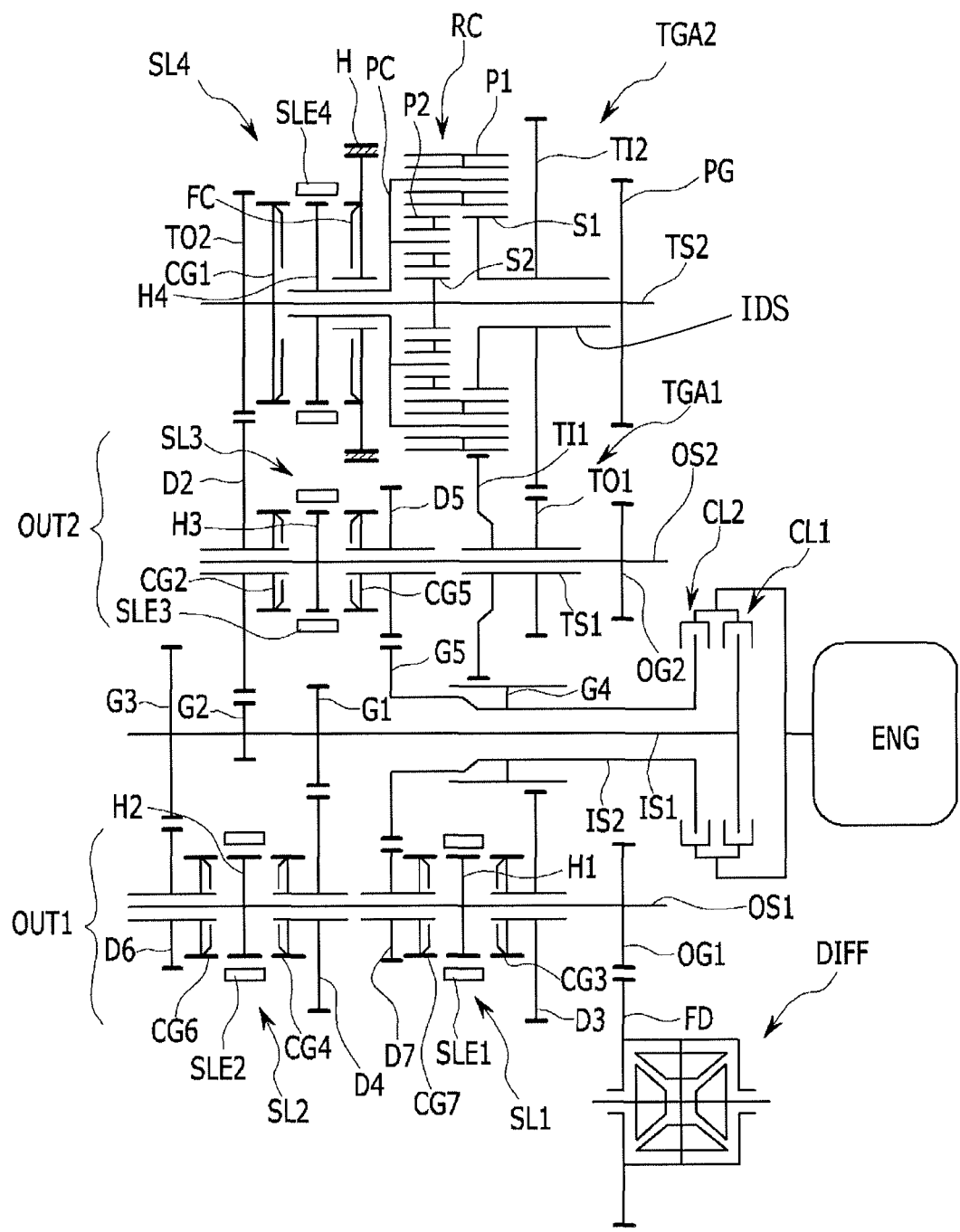
FIG. 1 is a schematic diagram of an exemplary double clutch transmission according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a double clutch transmission according to various embodiments of the present invention. Referring to FIG. 1, a double clutch transmission according to various embodiments of the present invention includes a variable connecting device provided with first and second clutches CL1 and CL2, an input device provided with first and second input shafts IS1 and IS2, a speed output device provided with first and second speed output units OUT1 and OUT2 converting rotation speed of power input through the input device according to each shift-speed and outputting the converted power, a first transfer gear assembly TGA1 and a second transfer gear assembly TGA2.

The first and second clutches CL1 and CL2 included in the variable connecting device selectively transmits torque of an engine ENG to the first and second input shafts IS1 and IS2. The first clutch C1 selectively transmits the torque of the engine ENG to the first input shaft IS1 and the second clutch CL2 selectively transmits the torque of the engine ENG to the second input shaft IS2.

The input device includes a first input shaft IS1 selectively connected to the engine ENG through the first clutch CL1 and a second input shaft IS2 selectively connected to the engine ENG through the second clutch CL2. The second input shaft IS2 is a hollow shaft, and the first input shaft IS1 is inserted in the second input shaft IS2 without rotational interference with the second input shaft IS2.

First, second and third input gears G1, G2, and G3 are disposed at an exterior circumference of the first input shaft IS1 with predetermined distances. The first, second and third input gears G1, G2, and G3 are positioned at a rear portion of the first input shaft IS1 penetrating the second input shaft IS2 and are disposed in a sequence of the first, second and third input gears G1, G2, and G3.

Fourth and fifth input gears G4 and G5 are disposed on the second input shaft IS2 with a predetermined distance. The fourth input gear G4 is disposed at a front portion of the second input shaft IS2 and the fifth input gear G5 is disposed at a rear portion of the second input shaft IS2.

Therefore, the first, second and third input gears G1, G2 and G3 as well as the first input shaft IS1 are rotated if the first clutch CL1 is operated, and the fourth and fifth input gears G4 and G5 as well as the second input shaft IS2 are rotated if the second clutch CL2 is operated.

The first, second, third, fourth and fifth input gears G1, G2, G3, G4 and G5 are input gears operating at each shift-speed and teeth numbers thereof are determined according to target gear ratio at each shift-speed.

The speed output device that changes rotation speed of the torque input through the input device and outputs the changed speed includes the first and second speed output units OUT1 and OUT2 disposed in parallel or substantially in parallel with the first and second input shafts IS1 and IS2.

The first speed output unit OUT1 includes a first output shaft OS1 disposed in parallel with and away from the first and second input shafts IS1 and IS2, third, fourth, sixth and seventh forward speed gears D3, D4, D6, and D7, a first synchronizer SL1 selectively connecting the third forward speed gear D3 or the seventh forward speed gear D7 to the first output shaft OS1, a second synchronizer SL2 selectively connecting the fourth forward speed gear D4 or the sixth forward speed gear D6 to the first output shaft OS1 and a first output gear OG1.

The third forward speed gear D3 is engaged with the fourth input gear G4 and the seventh forward speed gear D7 is engaged with the fifth input gear G5.

In addition, the first synchronizer SL1 includes a first hub gear H1 fixedly disposed on the first output shaft OS1, a first sleeve SLE1 meshed at an external circumference of the first hub gear H1 and being slidable in an axial direction, a third forward speed clutch gear CG3 integrally formed with the third forward speed gear D3 and selectively engaged with the first sleeve SLE1 and a seventh forward speed clutch gear CG7 integrally formed with the seventh forward speed gear D7 and selectively engaged with the first sleeve SLE1.

If the first sleeve SLE1 is engaged with the third forward speed clutch gear CG3, rotation speed of the engine ENG is changed according to gear ratios of the fourth input gear G4 and the third forward speed gear D3 and the changed rotation speed is output through the first output shaft OS1 and the first output gear OG1. Therefore, a third forward speed is achieved. In addition, if the first sleeve SLE1 is engaged with the seventh forward speed clutch gear CG7, the rotation speed of the engine ENG is changed according to gear ratios of the fifth input gear G5 and the seventh forward speed gear D7 and the changed rotation speed is output through the first output shaft OS1 and the first output gear OG1. Therefore, a seventh forward speed is achieved.

The fourth forward speed gear D4 is engaged with the first input gear G1 and the sixth forward speed gear D6 is engaged with the third input gear G3.

In addition, the second synchronizer SL2 includes a second hub gear H2 fixedly disposed on the first output shaft OS1, a second sleeve SLE2 meshed at an external circumference of the second hub gear H2 and being slidable in the axial direction, a fourth forward speed clutch gear CG4 integrally formed with the fourth forward speed gear D4 and selectively engaged with the second sleeve SLE2 and a sixth forward speed clutch gear CG6 integrally formed with the sixth forward speed gear D6 and selectively engaged with the second sleeve SLE2.

If the second sleeve SLE2 is engaged with the fourth forward speed clutch gear CG4, the rotation speed of the engine ENG is changed according to gear ratios of the first input gear G1 and the fourth forward speed gear D4 and the changed rotation speed is output through the first output shaft OS1 and the first output gear OG1. Therefore, a fourth forward speed is achieved. In addition, if the second sleeve SLE2 is engaged with the sixth forward speed clutch gear CG6, the rotation speed of the engine ENG is changed according to gear ratios of the third input gear G3 and the sixth forward speed gear D6 and the changed rotation speed is output through the first output shaft OS1 and the first output gear OG1. Therefore, a sixth forward speed is achieved.

The power converted by the first speed output unit OUT1 is transmitted to the first output gear OG1 mounted on a front end portion of the first output shaft OS1 to a final reduction gear FD of a differential apparatus DIFF.

The second speed output unit OUT2 includes an output shaft OS2 disposed in parallel with and away from the first and second input shafts IS1 and IS2, the first transfer gear assembly TGA1, second and fifth forward speed gears D2 and D5, a third synchronizer SL3 selectively connecting the second forward speed gear D2 or the fifth forward speed gear D5 to the second output shaft OS2 and a second output gear OG2.

The first transfer gear assembly TGA1 includes a first transfer gear shaft TS1 being a hollow shaft and disposed at a radial exterior of the second output shaft OS2, a first transfer input gear TI1 disposed at a side portion of the first transfer gear shaft TS1 and engaged with the fourth input gear G4 and a first transfer output gear TO1 disposed at the other side portion of the first transfer gear shaft TS1.

In addition, since a diameter of the first transfer input gear TI1 is larger than that of the first transfer output gear TO2, the rotation speed input to the first transfer input gear TI1 is reduced through the first transfer output gear TO2.

In addition, the second forward speed gear D2 is engaged with the second input gear G2 and the fifth forward speed gear D5 is engaged with the fifth input gear G5.

The third synchronizer SL3 includes a third hub gear H3 fixedly disposed on the second output shaft OS2, a third sleeve SLE3 engaged at an external circumference of the third hub gear H3 and being slidable in the axial direction, a second forward speed clutch gear CG2 integrally formed with the second forward speed gear D2 and selectively engaged with the third sleeve SLE3 and a fifth forward speed clutch gear CG5 integrally formed with the fifth forward speed gear D5 and selectively engaged with the third sleeve SLE3.

If the third sleeve SLE3 is engaged with the second forward speed clutch gear CG2, the rotation speed of the engine ENG is changed according to gear ratios of the second input gear G2 and the second forward speed gear D2 and the changed rotation speed is output through the second output shaft IS2 and the second output gear OG2. Therefore, a third forward speed is achieved. In addition, if the third sleeve SLE3 is engaged with the fifth forward speed clutch gear CG5, the rotation speed of the engine ENG is changed according to gear ratios of the fifth input gear G5 and the fifth forward speed gear D5 and the changed rotation speed is output through the second output shaft OS2 and the second output gear OG2. Therefore, a fifth forward speed is achieved.

The power converted by the second speed output unit OUT2 is transmitted to the final reduction gear FD of the differential apparatus DIFF through the second output gear OG2 mounted at a front portion of the second output shaft OS2.

Meanwhile, the second transfer gear assembly TGA2 changes direction and rotation speed of the power transmitted from the first transfer gear assembly TGA1 and outputs the changed power to the second output shaft OS2.

For this purpose, the second transfer gear assembly TGA2 includes a second transfer gear shaft TS2 disposed in parallel with and away from the first and second input shafts IS1 and IS2, a second transfer input gear TI2, a rotating direction changing device RC, a fourth synchronizer SL4, a second transfer output gear TO2 and a parking brake gear PG.

The rotating direction changing device RC is integrally formed with an idle shaft IDS being a hollow shaft and disposed on a radial exterior of the second transfer gear shaft TS2 without rotational interference therebetween. The rotating direction changing device RC includes a second transfer input gear TI2 formed at a side portion of the idle shaft IDS and engaged with the first transfer output gear TO1, a first sun gear S1 integrally formed at the other side portion of the idle shaft IDS, a second sun gear S2 integrally formed with the second transfer gear shaft TS2 and a carrier PC rotatably supporting a first pinion P1 disposed at a radial exterior of the second transfer gear shaft TS2 without rotational interference therebetween and engaged with the first sun gear S1 and a second pinion P2 engaged with the first pinion P1 and the second sun gear S2.

That is, the first sun gear S1 engaged with the first pinion P1 is directly connected to the second transfer input gear TI2 so as to be operated as an input element, a second sun gear S2 is operated as an output element that outputs a negative rotation speed at a reverse speed, and the carrier PC is operated as an output element at a first forward speed and is operated as a fixed element at the reverse speed.

Meanwhile, the fourth synchronizer SL4 includes a fourth hub gear H4 fixedly disposed on the carrier PC, a fourth sleeve SLE4 engaged at an external circumference of the fourth hub gear H4 and being slidable in the axial direction, a first forward speed clutch gear CG1 integrally formed with the second transfer gear shaft TS2 at a side of the fourth hub gear H4 and selectively engaged with the fourth sleeve SLE4 and a fixed clutch gear FC connected to a transmission housing H at the other side of the fourth hub gear H4 and selectively engaged with the fourth sleeve SLE4.

If the fourth sleeve SLE4 is engaged with the first forward speed clutch gear CG1, the power transmitted from the carrier PC is output through the second transfer gear shaft TS2 and the second transfer output gear TO2. If the fourth sleeve SLE4 is engaged with the fixed clutch gear FC, the negative rotation speed transmitted from the second sun gear S2 is output through the second transfer gear shaft TS2 and the second transfer output gear TO2.

Sleeves SLE1, SLE2, SLE3 and SLE4 applied respectively to the first, second, third and fourth synchronizers SL1, SL2, SL3 and SL4 are operated by additional actuators and the actuators are controlled by a transmission control unit.

The actuator may be operated by an electric motor or a hydraulic control system but is not limited to this.

Figure 2:
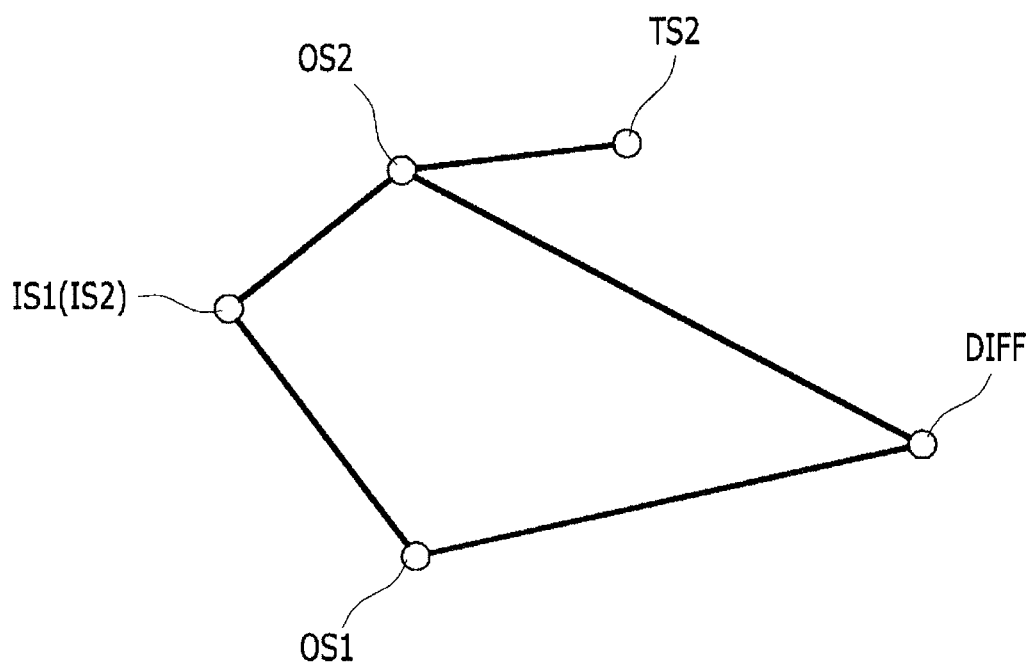
FIG. 2 is schematic diagram illustrating arrangement of shafts used in an exemplary double clutch transmission according to the present invention.

FIG. 2 is schematic diagram illustrating arrangement of shafts used in a double clutch transmission according to an exemplary embodiment of the present invention.

Referring to FIG. 2, the first and second input shafts IS1 and IS2, the first and second output shafts OS1 and OS2, the second transfer gear shaft TS2 and the differential apparatus DIFF are disposed away from each other, and the first and second output gears OG1 and OG2 fixedly disposed respectively on the first and second output shafts OS1 and OS2 are connected to the final reduction gear FD of the differential apparatus DIFF.

Figure 3:
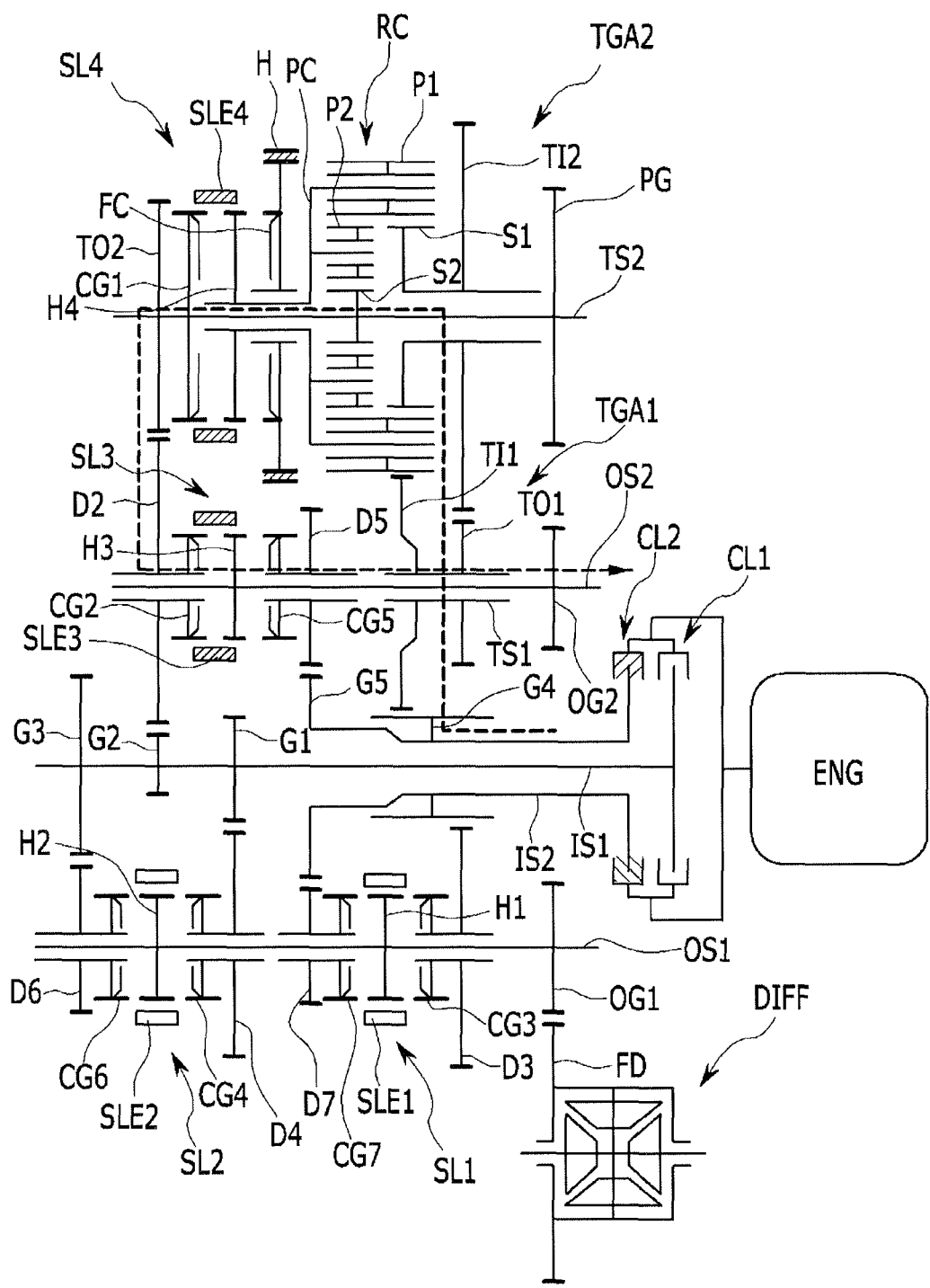
FIG. 3 is a schematic diagram illustrating flow of power at the first forward speed in an exemplary double clutch transmission according to the present invention.

FIG. 3 is a schematic diagram illustrating flow of power at the first forward speed in a double clutch transmission according to an exemplary embodiment of the present invention.

Odd-numbered speeds and even-numbered speeds are alternately realized at the second forward speed, the third forward speed, the fourth forward speed, the fifth forward speed, the sixth forward speed and the seventh forward speed other than the reverse speed and the first forward speed in the double clutch transmission according to some embodiments of the present invention. Alternate realization of the odd-numbered speeds and the even-numbered speeds is known. Therefore, detailed description thereof will be omitted.

Referring to FIG. 3, the power of the engine ENG is transmitted to the second input shaft IS2 by operation of the second clutch C2, the third sleeve SLE3 of the third synchronizer SL3 is engaged with the second forward speed clutch gear CG2, and the fourth sleeve SLE4 of the fourth synchronizer SL4 is engaged with the first forward speed clutch gear CG1 at the first forward speed.

At this time, the rotation speed of the second input shaft IS2 is input to the first transfer gear assembly TGA1 as the negative rotation speed through the fourth input gear G4 and the first transfer input gear TI1, and the negative rotation speed of the first transfer gear assembly TGA1 is input to the second transfer input gear TI2 as positive rotation speed through the first transfer output gear TO1 and drives the first sun gear S1.

At this time, the carrier PC is connected to the second transfer gear shaft TS2 though the fourth hub gear H4, the fourth sleeve SLE4 and the first forward speed clutch gear CG1, and the second sun gear S2 is engaged with the second pinion P2 such that the rotating direction changing device RC becomes a direct-coupling state. Therefore, the power input to the first sun gear S1 is transmitted to the second transfer gear shaft TS2 without change of the rotation speed.

In this case the power of the second transfer gear shaft TS2 is output to the differential apparatus DIFF through the second transfer output gear TO2, the second forward speed gear D2, the second forward speed clutch gear CG2, the second output shaft OS2, and the second output gear OG2.

At this time, speed ratio at the first forward speed is determined by gear ratios of the fourth input gear G4, the first transfer input gear TI1, the first transfer output gear TO1, the second transfer input gear TI2, the second transfer output gear TO2, and the second forward speed gear D2.

Figure 4:
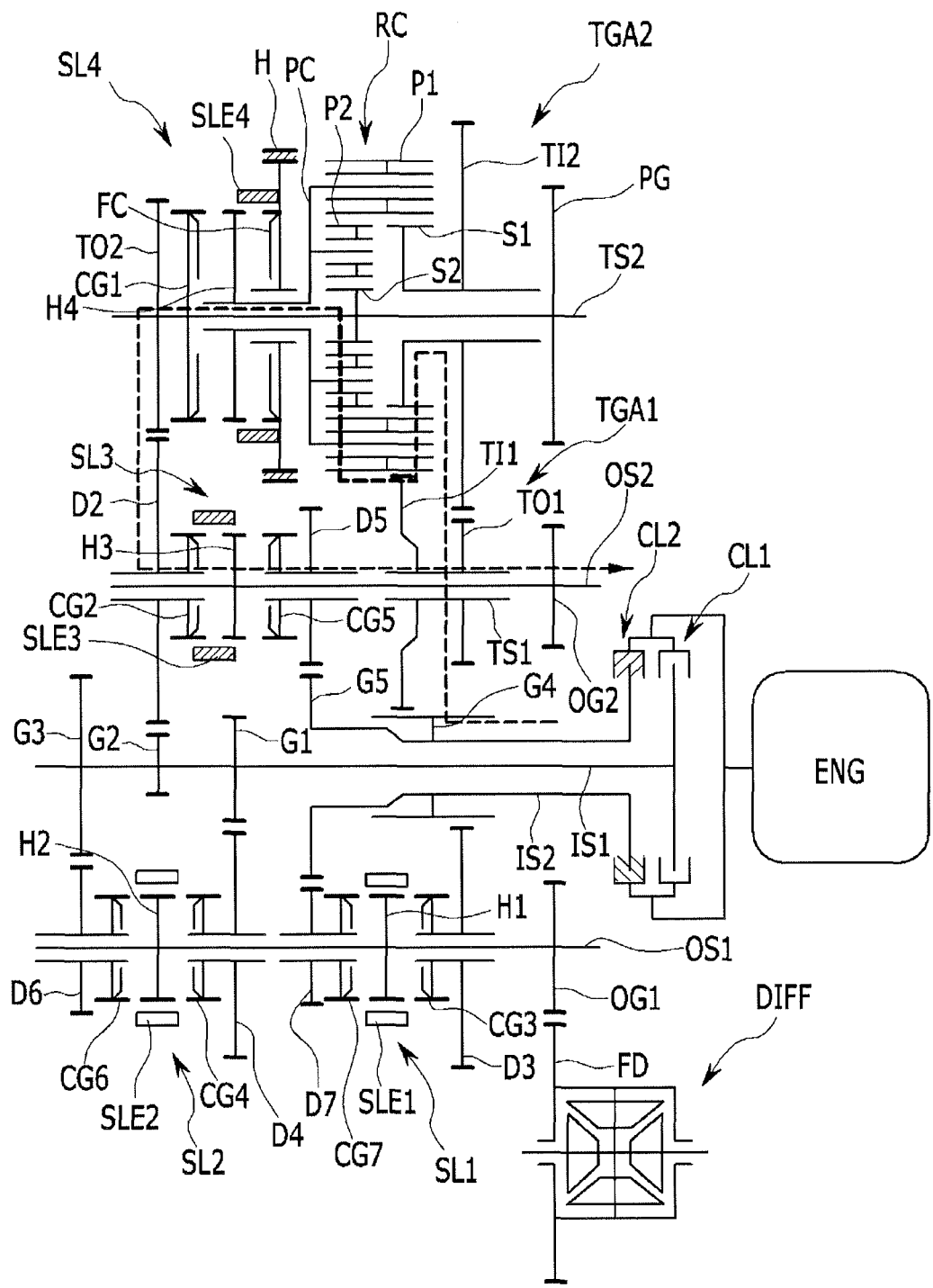
FIG. 4 is a schematic diagram illustrating flow of power at a reverse speed in an exemplary double clutch transmission according to the present invention.

FIG. 4 is a schematic diagram illustrating flow of power at a reverse speed in a double clutch transmission according to an exemplary embodiment of the present invention. Referring to FIG. 4, the power of the engine ENG is transmitted to the second input shaft IS2 by operation of the second clutch CL2, the third sleeve SLE3 of the third synchronizer SL3 is engaged with the second forward speed clutch gear CG2, and the fourth sleeve SLE4 of the fourth synchronizer SL4 is engaged with the fixed clutch gear FC at the reverse speed.

At this time, the rotation speed of the second input shaft IS2 is input to the transfer gear assembly TGA1 as the negative rotation speed through the fourth input gear G4 and the first transfer input gear TI1, and the negative rotation speed of the first transfer gear assembly TGA1 is input to the second transfer input gear TI2 as the positive rotation speed through the first transfer output gear TO1 and drives the first sun gear S1.

At this time, since the fourth sleeve SLE4 is engaged with the fixed clutch gear FC, the carrier PC is operated as the fixed element and the first sun gear S1 is operated as the input element in the rotating direction changing device RC. Therefore, the negative rotation speed is output to the second sun gear S2.

Therefore, the second transfer gear shaft TS2 fixedly connected to the second sun gear S2 rotates inversely, and the negative rotation speed of the second transfer gear shaft TS2 is output to the differential apparatus DIFF through the second transfer output gear TO2, the second forward speed gear D2, the second forward speed clutch gear CG2, the second output shaft OS2, and the second output gear OG2.

At this time, speed ratio at the reverse speed is determined by gear ratios of the fourth input gear G4, the first transfer input gear TI1, the first transfer output gear TO1, the second transfer input gear TI2, the second transfer output gear TO2, and the second forward speed gear D2.

Meanwhile, the parking brake gear PG is disposed at a front end portion of the second transfer gear shaft TS2 and performs parking function.

According to various embodiments of the present invention, the first transfer gear assembly TGA1 including one synchronizer SL3, two speed gears, and two gears is disposed on the second output shaft OS2, and the rotating direction changing device RC, one synchronizer SL4, and two gears are disposed on the second transfer gear shaft TS2 disposed in parallel with the second output shaft OS2. Therefore, a length of the transmission may be shortened. Thereby, the transmission can be mounted in an engine compartment without layout change of the engine compartment. In addition, since the layout of the engine compartment is not changed, cost may be curtailed.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A double clutch transmission of a vehicle comprising:
a variable connecting device including first and second clutches and selectively transmitting power of a power source;
an input device including a first input shaft selectively receiving the power of the power source through the first clutch, and a second input shaft disposed at a radial exterior of the first input shaft without rotational interference therebetween and selectively receiving the power of the power source through the second clutch;
a speed output device including a first speed output unit disposed in parallel with the first and second input shafts, changing the power transmitted from the first input shaft or the second input shaft into four forward speeds and outputting the four forward speeds, and a second speed output unit disposed in parallel with the first and second input shafts, changing the power transmitted from the first input shaft or the second input shaft into two forward speeds and outputting the two forward speeds;
a first transfer gear assembly disposed in the second speed output unit, reducing a rotational speed of the power transmitted from the second input shaft and outputting the reduced rotational speed; and
a second transfer gear assembly disposed in parallel with the second speed output unit, changing the rotational speed transmitted from the first transfer gear assembly selectively into one forward speed or one reverse speed and transmitting the one forward speed or the one reverse speed to the second speed output unit.

2. The double clutch transmission of claim 1, wherein the first input shaft is provided with first, second and third input gears sequentially disposed thereon, and
wherein the first input gear is an input gear for achieving a fourth forward speed, the second input gear is an input gear for achieving a second forward speed and the third input gear is an input gear for achieving a sixth forward speed.

3. The double clutch transmission of claim 2, wherein the second input shaft is provided with fourth and fifth input gears sequentially disposed thereon, and
wherein the fourth input gear is an input gear for achieving a first forward speed, a third forward speed and the reverse speed, and the fifth input gear is an input gear for achieving a fourth forward speed.

4. The double clutch transmission of claim 3, wherein the first speed output unit comprises:
- a first output shaft disposed in parallel with and away from the first and second input shafts;
- third, fourth, sixth and seventh speed gears disposed on the first output shaft;
- a first synchronizer selectively connecting the third forward speed gear or the seventh forward speed gear to the first output shaft;
- a second synchronizer selectively connecting the fourth forward speed gear or the sixth forward speed gear to the first output shaft; and
- a first output gear fixedly disposed on the first output shaft.

5. The double clutch transmission of claim 4, wherein the third forward speed gear is engaged with the fourth input gear and the seventh forward speed gear is engaged with the fifth input gear.

6. The double clutch transmission of claim 4, wherein the fourth forward speed gear is engaged with the first input gear and the sixth forward speed gear is engaged with the third input gear.

7. The double clutch transmission of claim 3, wherein the second speed output unit comprises:
- a second output shaft disposed in parallel with and away from the first and second input shafts;
- second and fifth speed gears disposed on the second output shaft;
- a third synchronizer selectively connecting the second forward speed gear or the fifth forward speed gear to the second output shaft; and
- a second output gear fixedly disposed on the second output shaft.

8. The double clutch transmission of claim 7, wherein the second forward speed gear is engaged with the second input gear and the fifth forward speed gear is engaged with the fifth input gear.

9. The double clutch transmission of claim 1, wherein the first transfer gear assembly comprises:
- a first transfer gear shaft disposed at a radial exterior of the second output shaft of the second speed output unit without rotational interference therebetween;
- a first transfer input gear formed on an end portion of the first transfer gear shaft and engaged with the fourth input gear of the second input shaft; and
- a first transfer output gear formed on the other end portion of the first transfer gear shaft.

10. The double clutch transmission of claim 1, wherein the second transfer gear assembly comprises:
- a second transfer gear shaft disposed in parallel with and away from the first and second input shafts;
- a rotating direction changing device disposed on the second transfer gear shaft and adapted to receive the power from the second input shaft through a second transfer input gear and to change a rotating direction of the power;
- a fourth synchronizer controlling the rotating direction changing device to change the rotating direction; and
- a second transfer output gear transmitting power from the second transfer gear shaft to the second speed output device.

11. The double clutch transmission of claim 10, further comprising a parking brake gear fixedly disposed at the second transfer gear shaft.

12. The double clutch transmission of claim 10, wherein the rotating direction changing device comprises:
- an idle shaft disposed at a radial exterior of the second transfer gear shaft without rotational interference therebetween;
- a second transfer input gear fixedly disposed on a side portion of the idle shaft and receiving the power from the first transfer gear assembly;
- a first sun gear fixedly disposed on the other side portion of the idle shaft;
- a second sun gear fixedly disposed on the second transfer gear shaft; and
- a carrier disposed at a radial exterior of the second transfer gear shaft without rotational interference therebetween and rotatably supporting a first pinion engaged with the first sun gear and a second pinion engaged with the first pinion and the second sun gear.

13. The double clutch transmission of claim 12, wherein the fourth synchronizer comprises:
- a hub gear fixedly connected to the carrier;
- a sleeve engaged with an external circumference of the hub gear and being movable in an axial direction;
- a first forward speed clutch gear fixedly disposed on the second transfer gear shaft at a side of the hub gear and selectively engaged with the sleeve; and
- a fixed clutch gear fixedly connected to a transmission housing at the other side of the hub gear and selectively engaged with the sleeve.

14. A double clutch transmission of a vehicle comprising:
- a variable connecting device including first and second clutches and selectively transmitting power of a power source;
- an input device including a first input shaft provided with first, second and third input gears fixedly disposed on an external circumference thereof and selectively receiving the power of the power source through the first clutch, and a second input shaft provided with fourth and fifth input gears fixedly disposed on an external circumference thereof, disposed at a radial exterior of the first input shaft without rotational interference therebetween and selectively receiving the power of the power source through the second clutch;
- a first speed output unit including a first output shaft disposed in parallel with the first and second input shafts and provided with a first output gear fixedly disposed on an external circumference thereof, third, fourth, sixth and seventh speed gears disposed on the first output shaft, a first synchronizer selectively connecting the third forward speed gear or the seventh forward speed gear to the first output shaft and a second synchronizer selectively connecting the fourth forward speed gear or the sixth forward speed gear to the first output shaft;
- a second speed output unit including a second output shaft disposed in parallel with the first and second input shafts and provided with a second output gear fixedly disposed on an external circumference thereof, second and fifth speed gears disposed on the second output shaft and a third synchronizer selectively connecting the second forward speed gear or the fifth forward speed gear to the second output shaft;
- a first transfer gear assembly disposed in the second speed output unit, changing a rotational speed of the power transmitted from the second input shaft and outputting the changed rotational speed; and
- a second transfer gear assembly disposed in parallel with the second speed output unit, changing the rotational speed transmitted from the first transfer gear assembly selectively into one forward speed or one reverse speed and transmitting the one forward speed or the one reverse speed to the second speed output unit.

15. The double clutch transmission of claim 14, wherein the third forward speed gear is engaged with the fourth input gear and the seventh forward speed gear is engaged with the fifth input gear.

16. The double clutch transmission of claim 14, wherein the fourth forward speed gear is engaged with the first input gear and the sixth forward speed gear is engaged with the third input gear.

17. The double clutch transmission of claim 14, wherein the second forward speed gear is engaged with the second input gear and the fifth forward speed gear is engaged with the fifth input gear.

18. The double clutch transmission of claim 14, wherein the first transfer gear assembly comprises:
a first transfer gear shaft disposed at a radial exterior of the second output shaft of the second speed output unit without rotational interference therebetween;
a first transfer input gear formed on an end portion of the first transfer gear shaft and engaged with the fourth input gear of the second input shaft; and
a first transfer output gear formed on the other end portion of the first transfer gear shaft.

19. The double clutch transmission of claim 14, wherein the second transfer gear assembly comprises:
a second transfer gear shaft disposed in parallel with and away from the first and second input shafts;
a rotating direction changing device disposed on the second transfer gear shaft and adapted to receive the power from the second input shaft through a second transfer input gear and to change a rotating direction of the power;
a fourth synchronizer controlling the rotating direction changing device to change the rotating direction; and
a second transfer output gear transmitting power from the second transfer gear shaft to the second speed output device.

20. The double clutch transmission of claim 19, wherein the rotating direction changing device comprises:
an idle shaft disposed at a radial exterior of the second transfer gear shaft without rotational interference therebetween;
a second transfer input gear fixedly disposed on a side portion of the idle shaft and receiving the power from the first transfer gear assembly;
a first sun gear fixedly disposed on the other side portion of the idle shaft;
a second sun gear fixedly disposed on the second transfer gear shaft; and
a carrier disposed at a radial exterior of the second transfer gear shaft without rotational interference therebetween and rotatably supporting a first pinion engaged with the first sun gear and a second pinion engaged with the first pinion and the second sun gear.

* * * * *